(12) United States Patent
Gartland

(10) Patent No.: US 6,512,531 B1
(45) Date of Patent: Jan. 28, 2003

(54) FONT NAVIGATION TOOL

(75) Inventor: Richard A. Gartland, Bothell, WA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/289,489

(22) Filed: Apr. 9, 1999

(51) Int. Cl.[7] .......................... G06F 3/00; G06F 17/21; G06K 15/00; G06T 11/00
(52) U.S. Cl. ...................... 345/854; 345/467; 345/749; 345/866; 707/542
(58) Field of Search ................................ 345/467, 471, 345/748, 749, 764, 810, 853–855, 866; 707/529, 542

(56) References Cited

U.S. PATENT DOCUMENTS

| | | | |
|---|---|---|---|
| 5,185,818 A | | 2/1993 | Warnock ...................... 382/54 |
| 5,586,241 A | * | 12/1996 | Bauermeister et al. ...... 345/467 |
| 5,586,242 A | * | 12/1996 | McQueen, III et al. ..... 345/467 |
| 5,664,086 A | | 9/1997 | Brock et al. ................. 345/468 |
| 5,715,473 A | * | 2/1998 | Reed ........................... 707/542 |
| 5,781,714 A | * | 7/1998 | Collins et al. ............... 345/471 |
| 5,859,648 A | * | 1/1999 | Moore et al. ................ 345/471 |
| 5,877,776 A | * | 3/1999 | Beaman et al. ............. 707/542 |
| 5,893,915 A | * | 4/1999 | Cordell et al. .......... 707/542 X |
| 6,073,147 A | * | 6/2000 | Chan et al. .................. 707/542 |
| 6,073,148 A | * | 6/2000 | Rowe et al. ................. 707/542 |

OTHER PUBLICATIONS

"FontAssist 2.3 Review," wysiwyg:/7//http://www.vakcer.com/oberon/reviews/fontassist.htm, Jan. 31, 1999.
Balarad Software, "FontAssist," http://www.balarad.sk/sw/fa/index.htm, Jan. 15, 1999.
Balarad Software, "FontAssist: Manual," http://www.balarad.sk/sw/fa/manual.htm, Jan. 15, 1999.
Balarad Software, "FontAssist: Examples of FontAssist Use," http://www.balarad.sk/sw/fa/example.htm, Jan. 15, 1999.

(List continued on next page.)

*Primary Examiner*—John Cabeca
*Assistant Examiner*—X. L. Bautista
(74) *Attorney, Agent, or Firm*—Fish & Richardson P.C.

(57) ABSTRACT

Methods and apparatus that enable a user to select a font from a collection of available fonts. The invention receives font data identifying each font in a collection of available fonts, identifies a location in a navigation space for each available font, receives a target location, and uses the target location to identify a candidate font in the collection of available fonts. The navigation space is defined by a set of navigation attributes. Each navigation attribute corresponds to a distinguishing font characteristic. Each location is defined by a set of navigation attribute values for all navigation attributes defining the navigation space. The target location is defined by input values for each navigation attribute specified by a navigation input received interactively from the user. The candidate font is a font with a location in the navigation space identical to the first target location if the collection of available fonts contains such a font. If the collection of available fonts does not contain such a font, the candidate font is a font in the collection of available fonts that is close to the first target location in the navigation space. Particular embodiments have the following features. The invention interactively receives a second navigation input specifying a second input value for one or more navigation attributes, where the second input values and the first input values define a second target location in the navigation space, and uses the second target location to identify a second candidate font in the collection of available fonts. The target location is defined by the attribute values defining the navigation space location of a current font and an input value designating a desired change in an attribute value of the current font. The user can select the candidate font from a collection of installed fonts for use in an application running on a computer, or can download the candidate font from the World Wide Web.

34 Claims, 8 Drawing Sheets

OTHER PUBLICATIONS

Balarad Software, "FontAssist: Main Panel Description," http://www.balarad.sk/sw/fa/panel.htm, Jan. 15, 1999.
Balarad Software, "FontAssist: Example No. 1," http://www.balarad.sk/sw/fa/ex1.htm, Jan. 15, 1999.
Balarad Software, "FontAssist: Example No. 2," http://www.balarad.sk/sw/fa/ex2.htm, Jan. 15, 1999.
Balarad Software, "FontAssist: Example No. 3," http://www.balarad.sk/sw/fa/ex3.htm, Jan. 15, 1999.
Balarad Software, "FontAssist: Example No. 4," http://www.balarad.sk/sw/fa/ex4.htm, Jan. 15, 1999.
Balarad Software, "FontAssist: Example No. 5," http://www.balarad.sk/sw/fa/ex5.htm, Jan. 15, 1999.
Balarad Software, "Frequently Asked Questions," http://www.balarad.sk/sw/fa/faq.htm, Jan. 15, 1999.
"PANOSE Classification Metrics Guide," http://www-.fonts.com/hp/panose/greybook/pan1.htm, Feb. 14, 1997.
Michael S. De Laurentis, "PANOSE 1.0 Core Mapper Services," Hewlett–Packard Document EWC–93–0023b, Hewlett–Packard Corporation, 101 Stewart, Suite 700, Seattle, WA 98101 (1993).
Jason Staczek, Clyde D. McQueen & Michael S. De Laurentis, "PANOSE 1.0 Mapper Application interface," Hewlett–Packard Document EWC–93–0024g, Hewlett–Packard Corporation, 101 Stewart, Suite 700, Seattle, WA 98101 (1993).
Adobe Systems Incorporated, "Display Postcript System: Display Postcript Toolkit for X," Chs. 7 and 8, Apr. 15, 1993.
Adobe Systems Incorporated, "Type 1 Font Format Supplement: Technical Specification #5015," Jan. 15, 1994.
Adobe Systems Incorporated, "Font Naming Issues: Technical Note #5088," Apr. 12, 1993.
Adobe Systems Incorporated, "Customer First Support: PANOSE Feature Summary," Technical Support Database, Document No. 313761, http://www.adobe.com/supportservice/custsupport/SOLUTIONS/7a72.htm, Jun. 30, 1994.
James Felici, "Movable Type," *Windows Sources*, vol. 3, p. 123 (May 1995).
Paul Bonner, "On Windows *Computer Shoppen*," vol. 14, p. 530 (Aug. 1994).
Herb Bethoney, "Font Works for Windows", *PC Week*, vol. 11, p. 81 (May 1994).
Peter Dyson, "ElseWare's Infinifont: fonts by the numbers," *Seybold Report on Desktop Publishing*, vol. 8, p. 17 (Oct. 4, 1993).
"Microsoft license Panose font scheme: numbering system for TruType," *Seybold Report on Desktop Publishing*, vol. 5, p. 40, (Jun. 17, 1991).
Cooper, A.; *About Face: The Essentials of User Interface Design*; New York (1995).

* cited by examiner

| TYPEFACE | FANCINESS | FORMALITY |
|---|---|---|
| Garamond | 6 | 7 |
| Courier New | 4 | 3 |
| Century Gothic | 2 | 6 |
| DESDEMONA | 8 | 2 |

FONT NAVIGATION TOOL

BACKGROUND OF THE INVENTION

The present invention relates to computer implemented methods for enabling users to select a font having a desired set of visual characteristics from a collection of available fonts.

A set of characters with a particular design is called a "typeface". Digital typefaces, such as the PostScript® products available from Adobe Systems Incorporated of San Jose, Calif., generally include instructions for rendering characters in a particular font. The term "font" refers to an instance of a typeface, e.g., a particular weight and point size. In the following discussion, however, the terms "typeface" and "font" are used interchangeably to refer to a set of characters having a set of particular visual characteristics.

Many thousands of digital typefaces are available for use with computer implemented word processing and desktop publishing applications, although most users have access to far fewer due to memory constraints and cost. Even so, a user may have access to a large number of individual fonts on a given system; the proliferation of the World Wide Web and electronic commerce has given users immediate access to even more.

To use a font other than a system's default font, the user must select the font from the collection of available fonts installed on the user's computer. To use fonts other than those already installed the user must identify the desired font—for example by locating the font in a font database stored on local or remote memory devices, including locations on the World Wide Web—and install it for use. In some environments, the particular program, or even the user's computer, must be restarted before the newly installed font is available for use.

Traditional font selection programs typically require users to select fonts from alphabetical listings that display only the name of each available font. To find a desired font, the user must therefore either know the name of the desired font or examine a sample of each available font to determine its visual characteristics. One such selection tool is the Motif Font Selection Panel, which is available as part of the Display PostScript Toolkit for X from Adobe Systems Incorporated of San Jose, Calif.

A more visual font selection tool allows the user to apply a set of filters to the collection of available fonts and view a font or group of fonts having characteristics selected by those filters. An example of this kind of tool is the Motif Font Sampler, also part of the Display PostScript Toolkit for X. Like the alphabetical listings described above, however, such tools rely on font names to describe the visual attributes of available fonts, and do not offer the user the opportunity to navigate visually the universe of available fonts to locate a font or fonts having desired visual characteristics.

SUMMARY OF THE INVENTION

The invention provides methods for enabling a user to select a font from a collection of available fonts, and apparatus (including computer program products) implementing or embodying the methods of the invention.

In general, in one aspect, the invention features a method of enabling a user to select a font from a collection of available fonts. The method includes receiving font data identifying each font in a collection of available fonts and identifying a location in a navigation space for each available font, where the navigation space is defined by a set of navigation attributes corresponding to font characteristics and each location is defined by a set of navigation attribute values for all navigation attributes defining the navigation space; receiving from the user interactively a first navigation input that specifies a first input value for each of the navigation attributes, where the first input values define a first target location in the navigation space; and using the first target location to identify a first candidate font in the collection of available fonts by identifying a font with a location in the navigation space identical to the first target location if there is such a font in the collection of available fonts, and, if the collection of available fonts does not contain such a font, identifying a font in the collection of available fonts that is close to the first target location in the navigation space.

Implementations of the invention can include one or more of the following advantageous features. The method also includes receiving from the user interactively a second navigation input that specifies a second input value for one or more navigation attributes, where the second input values and the first input values define a second target location in the navigation space; and using the second target location to identify a second candidate font in the collection of available fonts. The first input value is obtained by determining the navigation space location of a current font; receiving a first input value designating a desired change in an attribute value of the current font; and using the navigation space location of the current font and the first input value designating the desired change to define the first target location. The first target location defines a volume in the navigation space and the font with a location in the navigation space identical to the first target location includes a font with a location within the volume defined by the first target location. The method also includes enabling the user to select the first candidate font for use in an application running on a computer. The collection of available fonts includes a collection of installed fonts. The collection of available fonts includes a collection of fonts stored at a location on the World Wide Web. The method also includes downloading the new font from the location on the World Wide Web and installing the new font in the computer. The navigation attributes are selected from the group consisting of family type, serif style, weight, proportion, contrast, stroke variation, arm style, letter form, midline and X height.

In general, in another aspect, the invention features a method of enabling a user to select a font from a collection of available fonts. The method includes receiving font information identifying each font in a collection of available fonts, the font information including a set of attribute values describing the appearance of each font; identifying a set of navigation attributes defining a navigation space, where each font in the collection of available fonts has a location in the navigation space defined by the font's attribute values; identifying the attribute values of a current font; receiving from the user one or more first input values designating a desired change in the appearance of the current font and corresponding to a change in one or more attribute values of the current font; using one or more attribute values of the current font and the first input values to define a first target location; and using the first target location to identify a first candidate font in the collection of available fonts by identifying a font with a location in the navigation space identical to the first target location if there is such a font in the collection of available fonts, and, if the collection of available fonts does not contain such a font, identifying a font in the collection of available fonts that is close to the first target location in the navigation space.

Implementations of the invention can include one or more of the following advantageous features. The method also includes receiving from the user one or more second input values designating a desired change in the appearance of the current font or the first candidate font; using the second input values to define a second target location in the navigation space; and using the second target location to identify a second candidate font in the collection of available fonts by identifying a font with a location in the navigation space identical to the second target location if there is such a font in the collection of available fonts, and, if the collection of available fonts does not contain such a font, identifying a font in the collection of available fonts that is close to the second target location in the navigation space.

In general, in another aspect, the invention features a method of enabling a user to select a font from a collection of available fonts. The method includes receiving font data identifying each font in a collection of available fonts and identifying a location in a font space for each available font, where the font space is defined by a set of font attributes and each location is defined by attribute values for all of the font attributes defining the font space; identifying a set of navigation attributes defining a navigation space; receiving from a user interactively a navigation input that specifies an input value for each of the navigation attributes, where the input values define a target location in the navigation space; and using the target location to identify a candidate font in the collection of available fonts by identifying a font with a location in the navigation space identical to the target location if there is such a font in the collection of available fonts, and, if the collection of available fonts does not contain such a font, identifying a font in the collection of available fonts that is close to the target location in the navigation space.

Implementations of the invention can include one or more of the following advantageous features. Each navigation attribute is a font attribute. At least one navigation attribute is function of a plurality of font attributes. The navigation space is a proper subspace of the font space. At least one input navigation attribute value defines a range of font attribute values. The target location defines a volume in the navigation space and the font with a location in the navigation space identical to the target location includes a font with a location within the volume defined by the target location.

In general, in another aspect, the invention features a computer program product, tangibly stored on a computer-readable medium, for enabling a user to select a font from a collection of available fonts. The program includes instructions to receive font data identifying each font in a collection of available fonts and identifying a location in a navigation space for each available font, where the navigation space is defined by a set of navigation attributes, each of which corresponds to a visual font characteristic, and where each location is defined by a set of navigation attribute values for all navigation attributes defining the navigation space; receive from the user interactively a first navigation input that specifies a first input value for each of the navigation attributes, where the first input values define a first target location in the navigation space; and use the first target location to identify a first candidate font in the collection of available fonts by identifying a font with a location in the navigation space identical to the first target location if there is such a font in the collection of available fonts, and, if the collection of available fonts does not contain such a font, identifying a font in the collection of available fonts that is close to the first target location in the navigation space.

Implementations of the invention can include one or more of the following advantageous features. The program also includes instructions to receive from the user interactively a second navigation input that specifies a second input value for one or more navigation attributes, where the second input values and the first input values define a second target location in the navigation space; and use the second target location to identify a second candidate font in the collection of available fonts. The instructions to receive the first input value for each attribute in the set of navigation attributes include instructions to determine the navigation space location of a current font; receive a first input value designating a desired change in an attribute value of the current font; and use the attribute values defining the navigation space location of the current font and the first input value designating the desired change to define the first target location. The first target location defines a volume in the navigation space and the font with a location in the navigation space identical to the first target location includes a font with a location within the volume defined by the first target location. The program also includes instructions to enable the user to select the first candidate font for use in an application running on a computer. The collection of available fonts includes a collection of installed fonts. The collection of available fonts includes a collection of fonts stored at a location on the World Wide Web. The program includes instructions to download the new font from the location on the World Wide Web and install the new font in the computer. The navigation attributes are selected from the group consisting of family type, serif style, weight, proportion, contrast, stroke variation, arm style, letter form, midline and X height.

In general, in another aspect, the invention features a computer program product, tangibly stored on a computer-readable medium, for enabling a user to select a font from a collection of available fonts. The program includes instructions to receive font information identifying each font in a collection of available fonts, where the font information includes a set of attribute values describing the visual appearance of each font; identify a set of navigation attributes defining a navigation space, where each font in the collection of available fonts has a location in the navigation space defined by the attribute values for the font; identify the attribute values of a current font; receive from the user one or more first input values designating a desired change in the appearance of the current font and corresponding to a change in one or more attribute values of the current font; use one or more attribute values of the current font and the first input values to define a first target location; and use the first target location to identify a first candidate font in the collection of available fonts by identifying a font with a location in the navigation space identical to the first target location if there is such a font in the collection of available fonts, and, if the collection of available fonts does not contain such a font, identifying a font in the collection of available fonts that is close to the first target location in the navigation space.

Implementations of the invention can include one or more of the following advantageous features. The program includes instructions to receive from the user one or more second input values designating a desired change in the appearance of the current font or the first candidate font; use the second input values to define a second target location in the navigation space; and use the second target location to identify a second candidate font in the collection of available fonts by identifying a font with a location in the navigation space identical to the second target location if there is such a font in the collection of available fonts, and, if the collection of available fonts does not contain such a font, identifying a font in the collection of available fonts that is close to the second target location in the navigation space.

In general, in another aspect, the invention features a computer program product, tangibly stored on a computer-readable medium, for enabling a user to select a font from a collection of available fonts. The program includes instructions to receive font data identifying each font in a collection of available fonts, where the font data identifies a location in a font space for each available font, the font space is defined by a set of font attributes, and each location is defined by attribute values for all font attributes defining the font space; identify a set of navigation attributes defining a navigation space; receive from a user interactively a navigation input that specifies an input value for each attribute in the set of navigation attributes, where the input values define a target location in the navigation space; and use the target location to identify a candidate font in the collection of available fonts by identifying a font with a location in the navigation space identical to the target location if there is such a font in the collection of available fonts, and, if the collection of available fonts does not contain such a font, identifying a font in the collection of available fonts that is close to the target location in the navigation space.

Implementations of the invention can include one or more of the following advantageous features. Each navigation attribute is a font attribute. At least one navigation attribute is function of a plurality of font attributes. The navigation space is a proper subspace of the font space. At least one input navigation attribute value defines a range of font attribute values.

In general, in another aspect, the invention features a system for enabling a user to select a font from a collection of available fonts. The system includes means for receiving font data identifying each font in a collection of available fonts and identifying a location in a navigation space for each available font, where the navigation space is defined by a set of navigation attributes, each navigation attribute corresponds to a visual font characteristic, and each location is defined by a set of navigation attribute values for all navigation attributes defining the navigation space; means for receiving from the user interactively a first navigation input that specifies a first input value for each of the navigation attributes, where the first input values defines a first target location in the navigation space; and means for using the first target location to identify a first candidate font in the collection of available fonts by identifying a font with a location in the navigation space identical to the first target location if there is such a font in the collection of available fonts, and, if the collection of available fonts does not contain such a font, identifying a font in the collection of available fonts that is close to the first target location in the navigation space.

Implementations of the invention can include one or more of the following advantageous features. The system includes means for receiving from the user interactively a second navigation input that specifies a second input value for one or more navigation attributes, where the second input values and the first input values define a second target location in the navigation space; and means for using the second target location to identify a second candidate font in the collection of available fonts. The means for receiving a first input value includes means for determining the navigation space location of a current font; means for receiving a first input value designating a desired change in an attribute value of the current font; and means for using the attribute values defining the navigation space location of the current font and the first input value designating the desired change to define the first target location.

Advantages that can be seen in implementations of the invention include one or more of the following. The user can graphically navigate the collection of available fonts based on visual relationships between fonts. As a result, the user can search for a desired font by designating changes from an initial or default font in one or more particular visual features. By interactively searching the collection of available fonts, the user can navigate gradually towards the desired font. Searching a database of font information that can be separate from the fonts themselves saves memory and computation time. The user can search a database of font information for installed fonts or fonts stored on local or remote memory devices, including devices associated with locations on the World Wide Web. The user can identify, purchase and download fonts not available on the user's computer.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
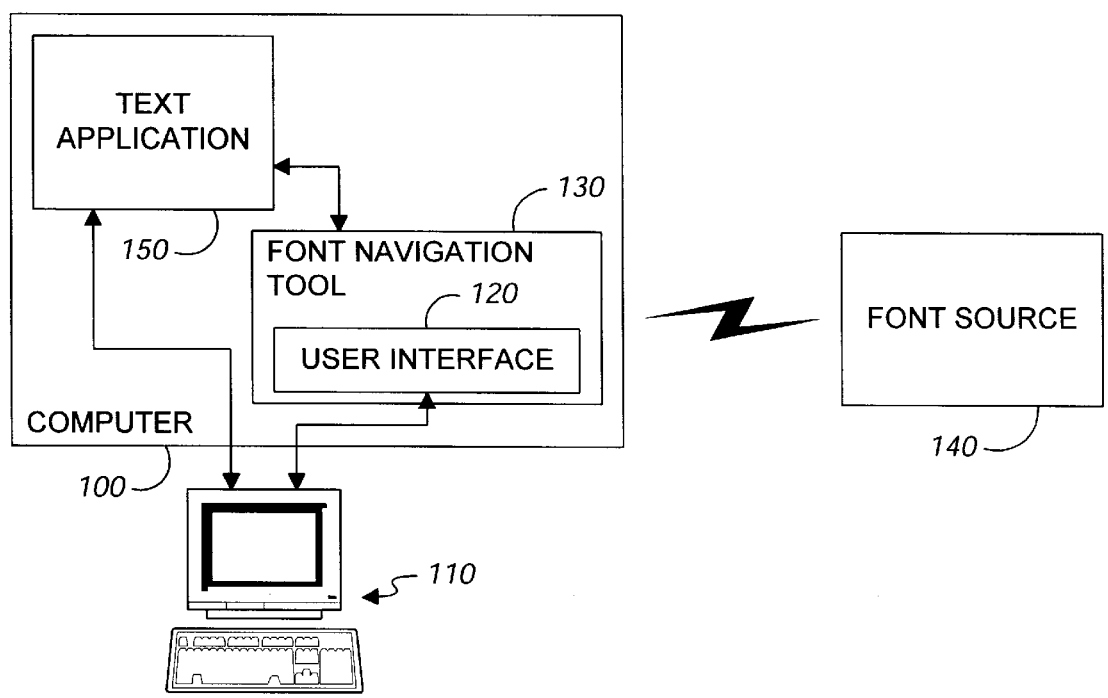
FIG. 1 is diagram illustrating a computer system implementing a font navigation tool.

As shown in FIG. 1, the invention can be implemented in a computer 100 equipped with input/output devices 110. Through user interface 120, font navigation tool 130 enables a user to navigate graphically a source of available fonts 140 to identify a font having desired visual characteristics for use in application 150, which may be a word processing application, a desktop publishing application or other such text application. Font source 140 can include any collection or library of fonts stored locally or remotely, for example a collection of fonts stored at a location on the World Wide Web.

Figure 2:
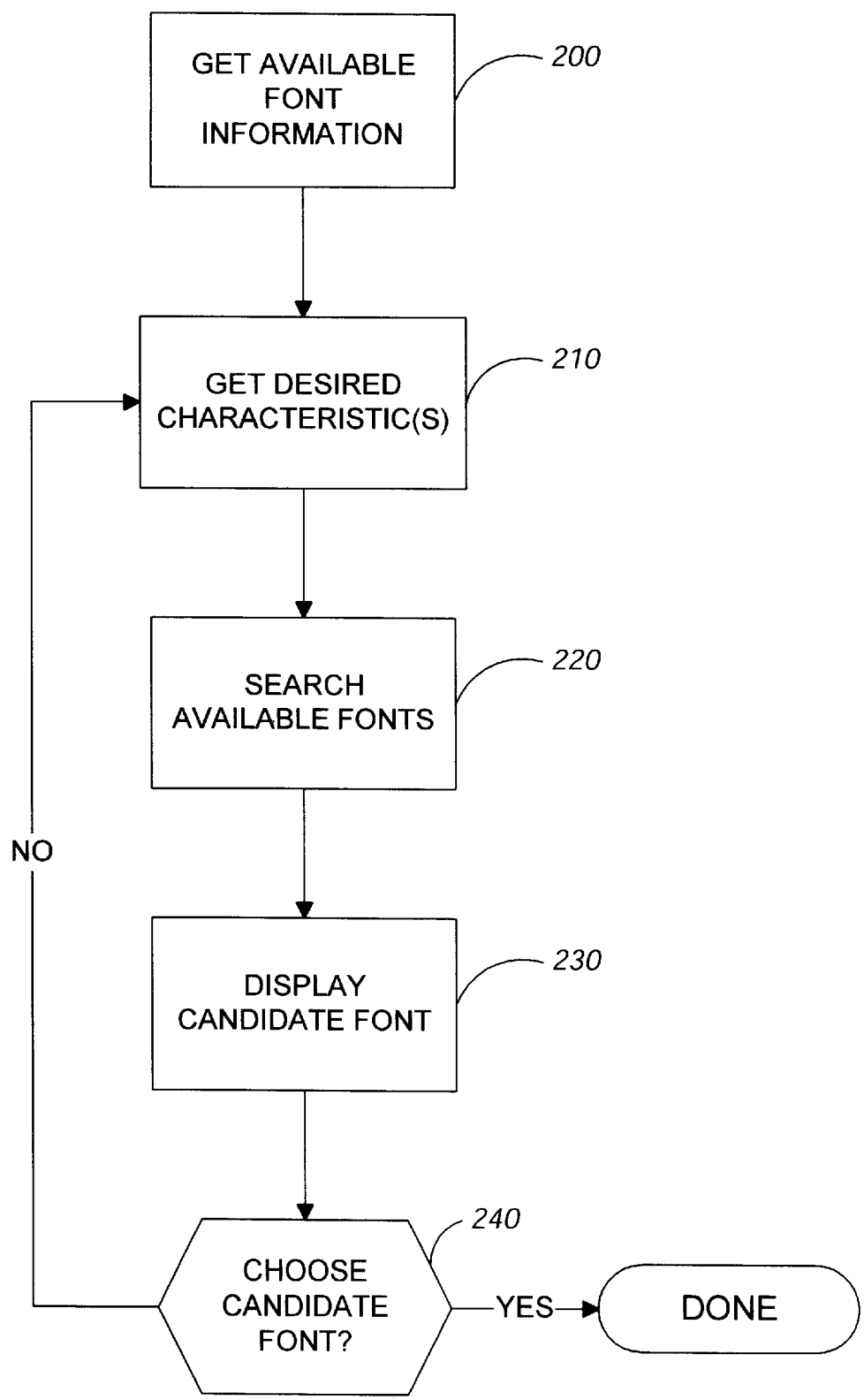
FIG. 2 is a flow diagram illustrating the use of a font navigation tool to select a font.

FIG. 2 illustrates a font selection session using a font navigation tool 130 to locate a font or typeface having desired visual characteristics. Font navigation tool 130 retrieves information that characterizes fonts in a collection of available fonts based on visual appearance (step 200). The user identifies one or more desired font characteristics (step 210), which font navigation tool 130 uses to search the collection of available fonts (step 220). Font navigation tool 130 then displays a candidate font or fonts having the desired visual characteristics (step 230). If no available font exactly matches the desired characteristics, font navigation tool optionally locates and displays an available candidate font that is similar with respect to the desired characteristics, as is described in more detail below. The user can select a candidate font for further use, for example in text application 150 running on computer 100 (the YES branch of step 240). If the selected font is not currently installed on computer 100, the user must install the font before it is available for use; if the selected font is located in a remote location such as the World Wide Web, font navigation tool 130 can provide the user instructions explaining how to purchase the font, download it and install it for use. If the candidate font is not acceptable, the user can identify different characteristics and repeat the search process (the NO branch of step 240).

Figure 3:
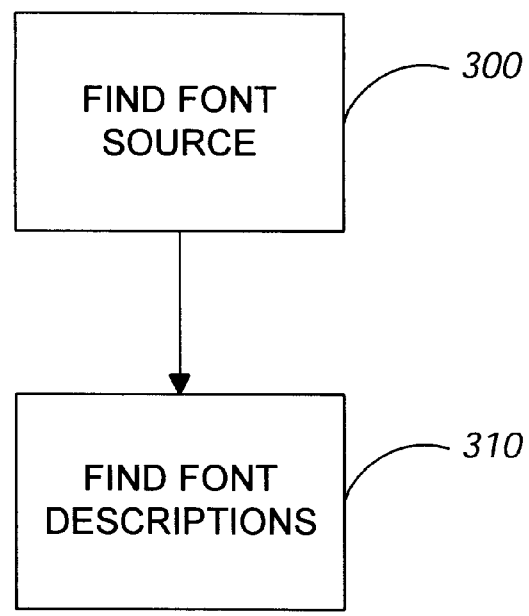
FIG. 3 is a flow diagram illustrating a process of obtaining font description data identifying a collection of available fonts.

FIG. 3 describes step 200 in more detail. To retrieve available font information, font navigation tool 130 locates a source of available font information, such as a library 140 of installed fonts, which includes information identifying each of the fonts available to font navigation tool 130 (step 300). Font navigation tool 130 also retrieves from font source 140 or other storage font descriptions defining a set of font attributes (step 310). Font attributes can be expressed as a range of attribute values and generally correspond to qualities that can be used to distinguish one font from another—for example, a font's visual characteristics. Appropriate font descriptions can be derived, for example, from metrics describing a font's visual appearance. Font descriptions can also include values derived from a font classification scheme that classifies fonts based on visual appearance. One such scheme is the PANOSE™ Typeface Matching System, available for license from Hewlett-Packard Corporation of Seattle, Wash.

Figure 4:
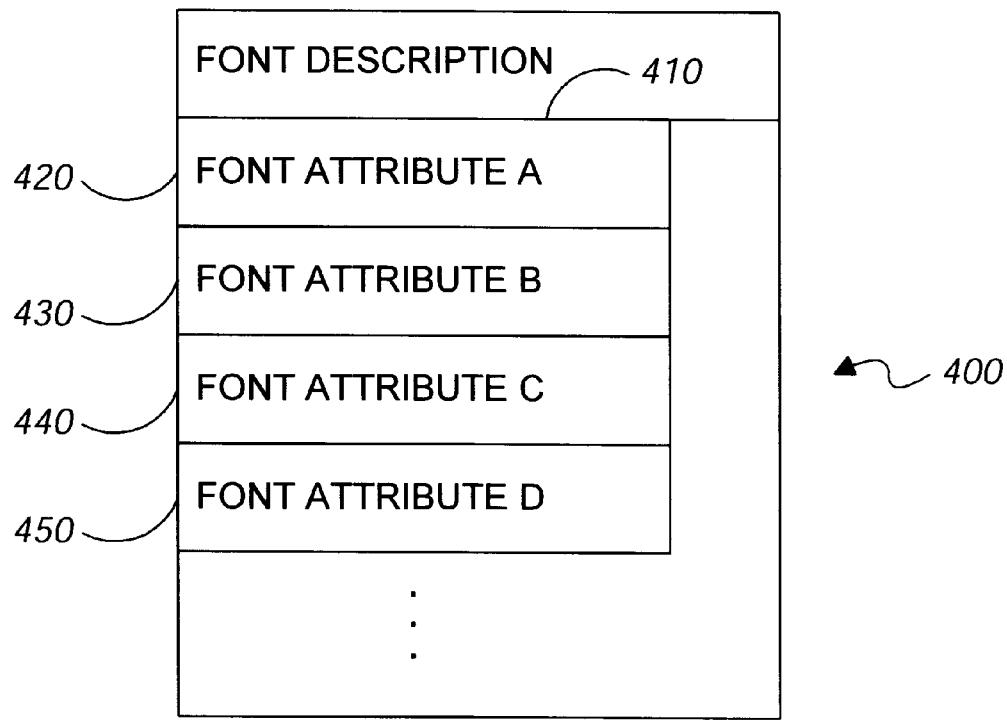
FIG. 4 is a diagram illustrating a description of a single font.

As shown in FIG. 4, font descriptions can take the form of records 400 that include arrays of values 410 corresponding to each of a set of attributes 420, 430, 440, 450 defining the appearance of the font. Each font classified in the PANOSE scheme is assigned a 10 digit number that describes the font's appearance. Each PANOSE digit corresponds to a particular font attribute—for example, family type, serif style, weight, proportion, contrast, stroke variation, arm style, letter form, midline and x-height. Alternative classification schemes can classify fonts based on more subjective criteria, such as "Fanciness," "Formality" and the like.

Font descriptions can be extracted directly from data defining the font, such as, for example, from calculations based on font shape. Alternatively, in the case of font classification schemes, font descriptions can be located in files external to the programs defining each font. For example, a database of PANOSE numbers is available on the Macintosh in a file named PANOSE Numbers; under Windows, the PANOSE number file is named panose.dat. The set of font attributes can be considered to form the axes of a multi-dimensional "font space," with the particular font attribute values for each font defining the font's position in the font space.

Figure 5:
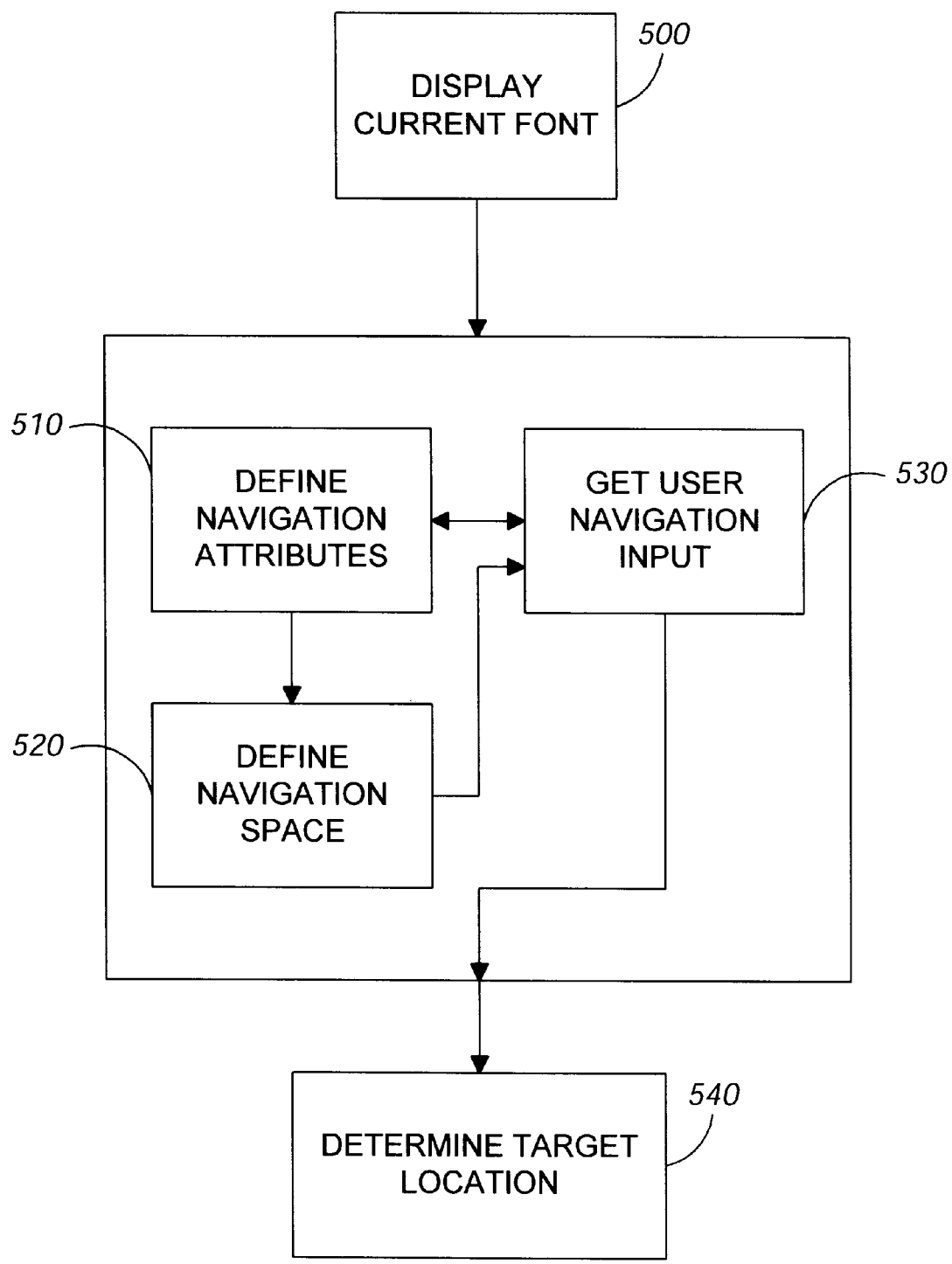
FIG. 5 is a flow diagram illustrating a process of getting a set of user-defined parameters for use by the font navigation tool.

FIG. 5 illustrates step 210 in more detail. Optionally, font navigation tool 130 displays an initial font that will serve as a starting point for the font selection session (step 500). Font navigation tool 130 defines a set of navigation attributes (step 510) derived from the font attributes described above, which it will use as search parameters to search for fonts available in font source 140. Like the font attributes described above, each navigation attribute can be expressed as a range of values and generally represents a quality that is useful for distinguishing fonts from each other. Navigation attributes can include, for example, the font attributes that define font description 400. Navigation attributes can also include a subset of the font attributes. One or more navigation attributes can also be derived from weighted combinations of font attributes.

Font navigation tool 130 uses the set of navigation attributes to define the axes of a multi-dimensional "navigation space" (step 520). If navigation attributes correspond to the available font attributes, the navigation space is simply the font space. If the navigation attributes are derived from a subset of font attributes or from combinations of one or more font attributes, the navigation space can be a subset of the font space. By using a subset of font attributes or weighted combinations of font attributes as navigation attributes the user can select particular descriptive attributes for use in searching the collection of available fonts. Because the navigation space is defined using navigation attributes derived from font attributes, each available font's location in the font space can be mapped to a location in the navigation space, and font navigation tool 130 can search the navigation space for fonts matching the user's desired characteristics. In one embodiment, font navigation tool 130 defines the navigation space based on a pre-determined set of navigation attributes. Alternatively, font navigation tool 130 can define the navigation space based on a variable number of navigation attributes (e.g., a subset of navigation attributes for which font information is available) specified during a font selection session—for example, based on the user's specification of one or more navigation attributes, or other user input, during the user input step which is described next.

Figure 6:
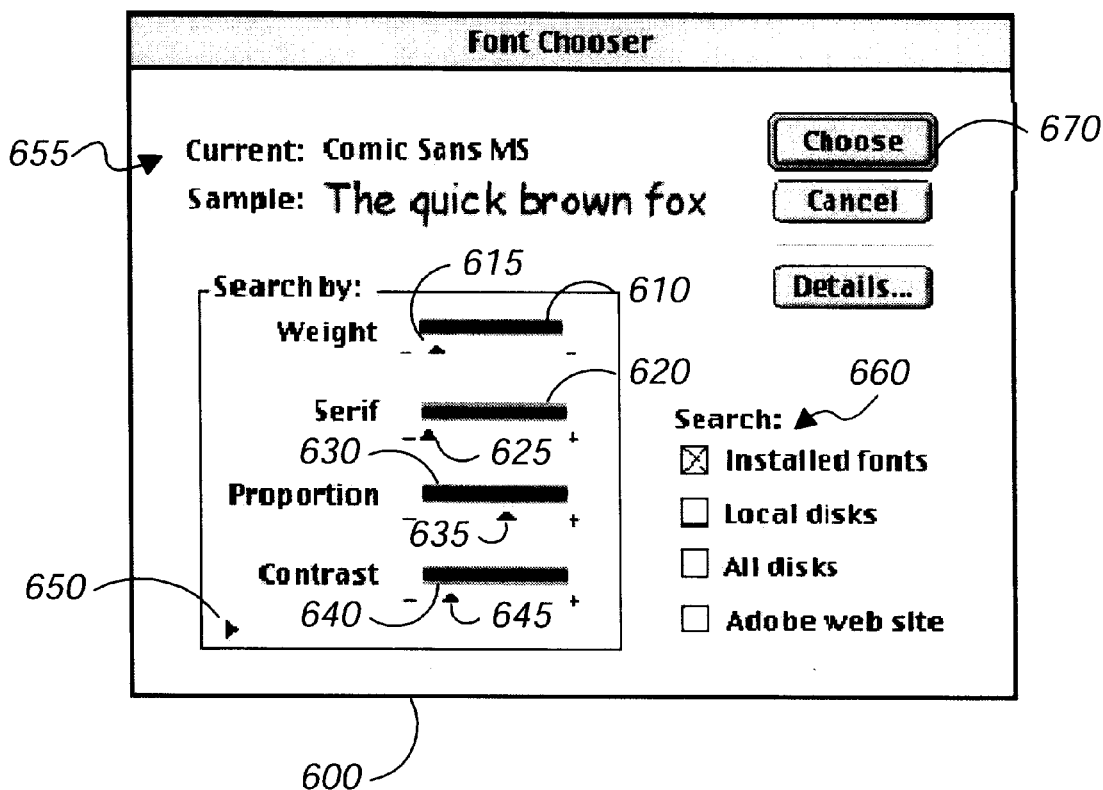
FIG. 6 is a dialog window for user input of font navigation parameters.

The user enters one or more navigation inputs through input devices 110 and user interface 120 (step 530). As illustrated in FIG. 6, font navigation tool provides a user interface, such as dialog window 600, through which the user can designate navigation inputs. This user interface can be designed to allow any convenient mode of data input, such as entry of values or manipulation of graphical elements such as sliders 610, 620, 630 and 640, each of which is assigned to an individual navigation attribute. The user can activate additional or different navigation attributes by pressing button 650. User interface 120 displays a current font 655, which may, at the beginning of a font selection session, be an initial font selected in text application 150 or a system default font. In the embodiment illustrated in FIG. 6, the initial position of pointers 615, 625, 635 and 645 of sliders 610, 620, 630 and 640, respectively, reflect the value for the corresponding navigation attribute of the current font. By changing the location of one or more of pointers 615, 625, 635 and 645, the user designates a change in the corresponding navigation attribute value from the current font. Alternatively, pointers 615, 625, 635 and 645 can be "centered" in the middle of the corresponding sliders, with movement of a given pointer by the user designating a relative change in the desired value for the corresponding navigation attribute.

In one embodiment, font navigation tool 130 launches a new search, as described below, whenever the user enters a navigation input by activating a slider. Alternatively, dialog window 600 can include a "Search" button, allowing the user to enter multiple navigation inputs by activating multiple sliders before font navigation tool 130 proceeds to search for a matching font. Optionally, dialog window 600 replaces current font 655 with a candidate font identified by searching font source 140 as described below. Alternatively, dialog window 600 displays both an initial or starting font and a current candidate font identified during the search. Dialog window 600 can also include a "History" button that allows the user to review all of the fonts retrieved by font navigation tool 130 in a given font selection session.

Referring again to FIG. 5, font navigation tool 130 uses the navigation input to determine a target location in the navigation space (step 540). This location corresponds to the location in the navigation space of a font having the navigation attribute values defined by the user navigation input. If the user enters a user navigation input having values for less than all available navigation attributes, font navigation tool 130 combines the input values with navigation attribute values derived from the initial font to define the target location. Alternatively, font navigation tool 130 can define the target location using only navigation attributes for which the user has provided navigation input values. Font navigation tool 130 then uses the target location to search the designated font source, as will be described next.

Figure 7:
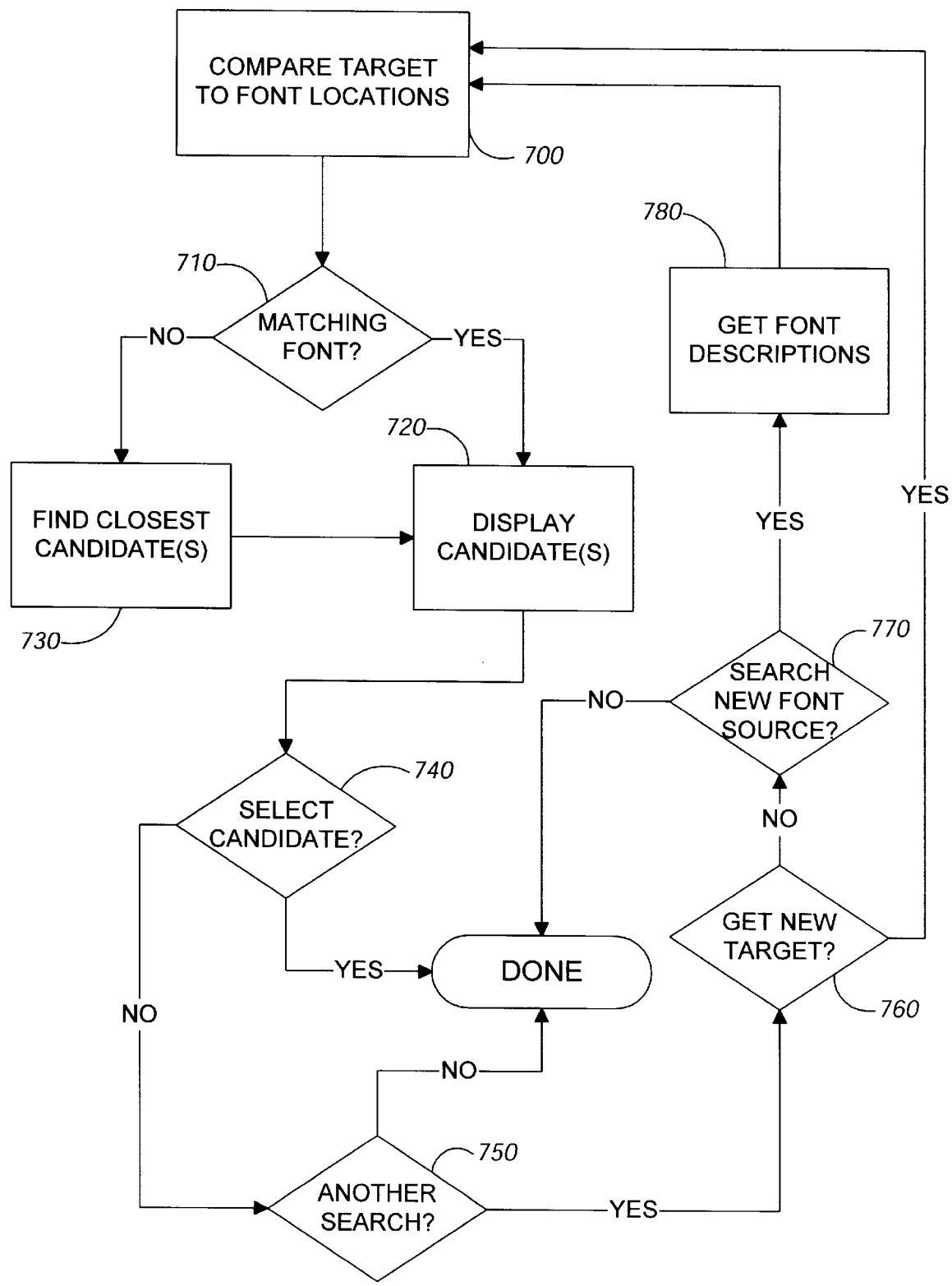
FIG. 7 is a flow diagram illustrating a process of using user-defined font navigation parameters to identify a font having desired characteristics from a collection of available fonts.

The process of searching the navigation space is illustrated in FIG. 7. Font navigation tool 130 searches the navigation space for a matching font or fonts by determining a distance between the target location and the location of the available fonts in the navigation space, based on the difference between the navigation attribute values defining the target location and the attribute values corresponding to each of the available fonts (step 700). One such matching algorithm is described in Michael S. De Laurentis, "PANOSE 1.0 Core Mapper Services," Hewlett-Packard Document EWC-93-0023b (1993), which algorithm description is incorporated herein by reference.

If an available font (or "candidate font") is located at the target location in the navigation space, that candidate font matches the desired font (the YES branch of step 710) and font navigation tool 130 displays the candidate font (step 720), for example, by replacing the previous "current" font 655 with the candidate font in user interface window 600. If there is no available font at the target location in the navigation space (the NO branch of step 710), font navigation tool 130 identifies and displays the candidate font or fonts that are closest to the target location (steps 730, 720). As an alternative to identifying candidate fonts based solely on Euclidean distance from a target location in the navigation space, font navigation tool 130 can use different distance metrics to identify candidates that closely match the input characteristics. Optionally, font navigation tool 130 can limit the search by searching the navigation space for candidate fonts located within a threshold distance from the target location. If no available font is within the threshold distance, font navigation tool 130 informs the user that no such font is available.

At any time, the user can select the current displayed candidate font, for example by pressing "Choose" button 670 in dialog window 600 (the YES branch of step 740). The user can also refine the search by entering a new navigation input—for example, by changing one or more navigation attribute values through sliders 610, 620, 630 and 640 in dialog window 600 (the YES branches of steps 750, 760). The user can also choose to search one or more other font sources (step 770), for example, by selecting the appropriate box 660 in dialog window 600. Font navigation tool 130 retrieves descriptions for fonts available in these sources (step 780) and initiates another search (step 700).

Figures 8A, 8B:
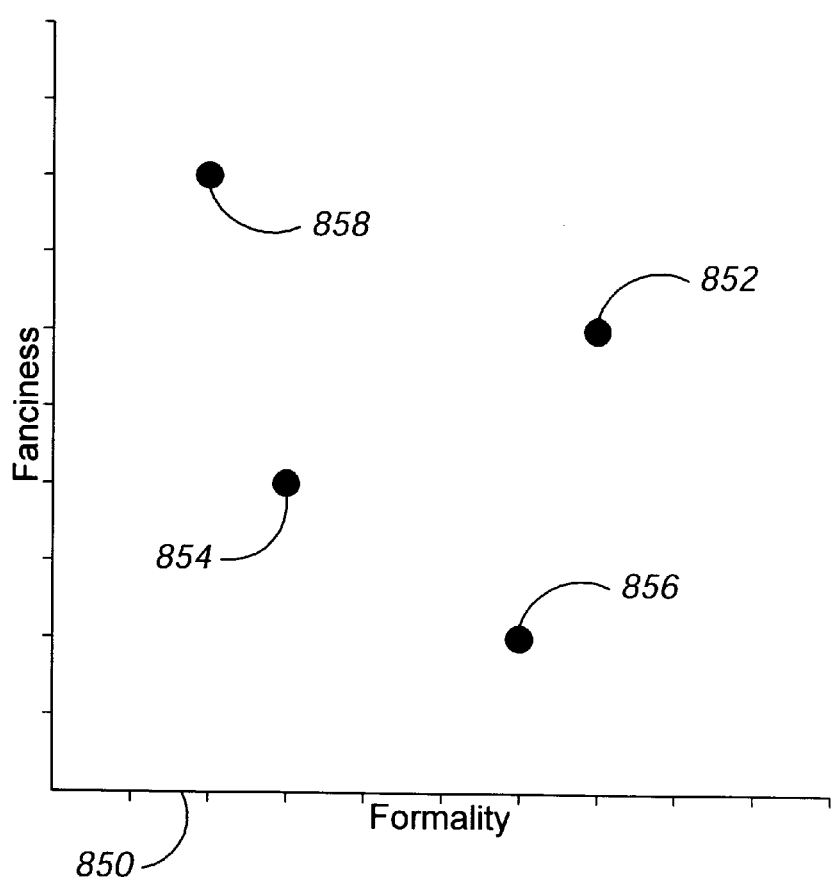
FIGS. 8A–8C illustrate the use of a font navigation tool to identify and select a desired font.
Figure 8C:
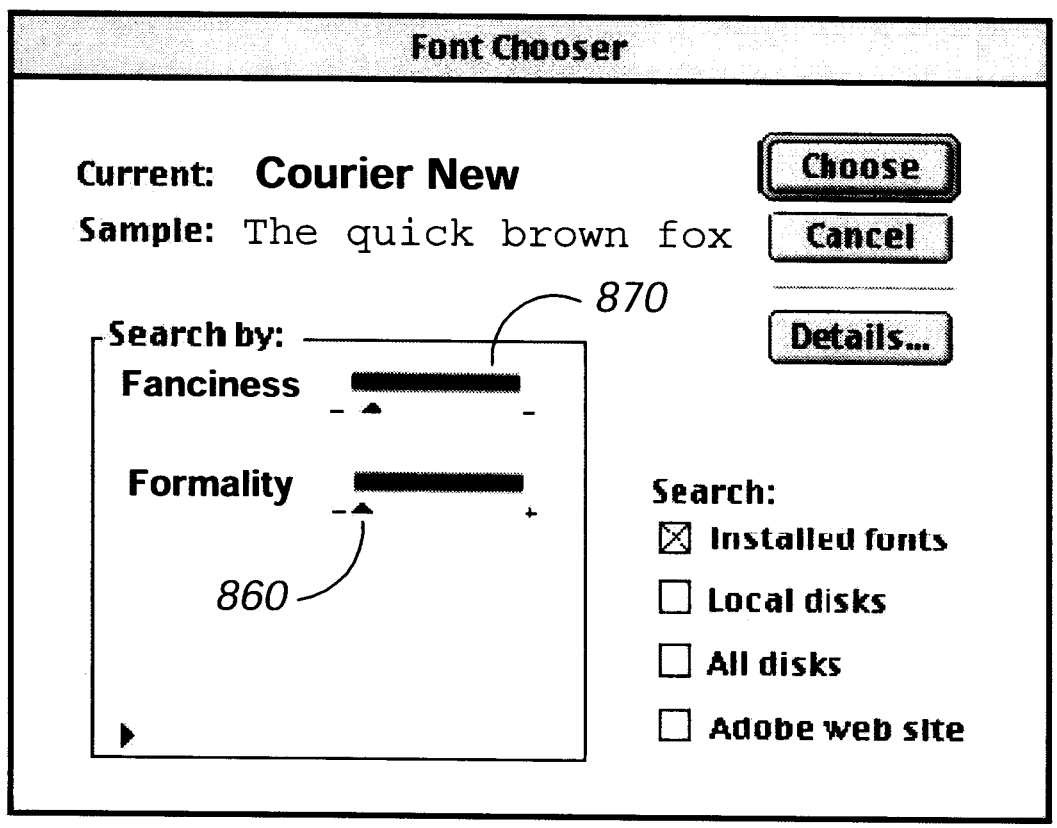

FIGS. 8A–8C provide a simple illustration of the use of a font navigation tool to select a typeface having desired characteristics. Font library 800 includes descriptions 810, 820, 830 and 840 of four typefaces. Each font is described by a pair of values (arbitrarily assigned for purposes of this example) corresponding to two font attributes: "Fanciness" and "Formality." These attributes define a font space 850, each typeface in font library 800 having unique locations 852, 854, 856 and 858 in font space 850 defined by its values for Fanciness and Formality.

The user designates a desired change from the current font (i.e., Courier New in this example) by moving Formality slider 860, indicating that the desired font should be slightly more formal, corresponding in a change in the Formality attribute value of, for example, 2 units. Using Formality as the sole navigation attribute, font navigation tool defines a "one-dimensional" navigation space, Formality being the sole navigation dimension and each typefaces' location being defined by the corresponding Formality attribute value. Alternatively, font navigation tool 130 can use both available font attributes as navigation attributes. Based on the user's input, font navigation tool 130 defines a target location corresponding to a Formality attribute value of 5.

Font navigation tool 130 searches the navigation space for a typeface matching the user's desired characteristics. Because there is no typeface in font library 800 having a navigation space location identical to the target location (i.e., a Formality attribute value of 5), font navigation tool 130 locates the closest typeface—Century Gothic, having a Formality attribute value of 6. Font navigation tool 130 displays this typeface. The user can choose to search a different database for a more desirable font. Alternatively, the user can enter an additional change or changes, for example, by moving the Formality slider 860 still further to find a more "formal" typeface (i.e., Garamond in this example), by moving the Fanciness slider 870 to find a "fancier" typeface (i.e., Desdemona in this example), or by a combination of such actions. At any time, the user can select the displayed typeface for further use as described above.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method for enabling a user to select a font from a collection of available fonts, comprising:
   receiving font data identifying each font in a collection of available fonts and identifying a location in a navigation space for each available font, the navigation space being defined by a set of navigation attributes, each navigation attribute corresponding to a visual font characteristic, each location being defined by a set of navigation attribute values for all navigation attributes defining the navigation space;
   receiving from the user interactively a first navigation input that specifies a first input value for each of the navigation attributes in a subset of navigation attributes including less than all the navigation attributes, the first input values defining a first target location in the navigation space; and
   using the first target location to identify a first candidate font in the collection of available fonts by identifying a font with a location in the navigation space identical to the first target location if the collection of available fonts contains such a font, and, if the collection of available fonts does not contain such a font, identifying a font in the collection of available fonts that is close to the first target location in the navigation space.

2. The method of claim 1, further comprising:
   receiving from the user interactively a second navigation input that specifies a second input value for one or more navigation attributes, the second input values and the first input values defining a second target location in the navigation space; and
   using the second target location to identify a second candidate font in the collection of available fonts.

3. The method of claim 1, wherein receiving a first input value for each attribute in the subset of navigation attributes comprises:
   determining the navigation space location of a current font;
   receiving a first input value designating a desired change in an attribute value of the current font; and
   using the attribute values defining the navigation space location of the current font and the first input value designating the desired change to define the first target location.

4. The method of claim 3, wherein the first target location defines a volume in the navigation space and the font with a location in the navigation space identical to the first target location comprises a font with a location within the volume defined by the first target location.

5. The method of claim 4, further comprising:
   enabling the user to select the first candidate font for use in an application running on a computer.

6. The method of claim 4, wherein:
   the collection of available fonts comprises a collection of installed fonts.

7. The method of claim 4, wherein:
   the collection of available fonts comprises a collection of fonts stored at a location on the World Wide Web.

8. The method of claim 7, further comprising:
   downloading the new font from the location on the World Wide Web; and
   installing the new font in the computer.

9. The method of claim 1, wherein:
   the navigation attributes are selected from the group consisting of family type, serif style, weight, proportion, contrast, stroke variation, arm style, letter form, midline and X height.

10. A method for enabling a user to select a font from a collection of available fonts, comprising:
    receiving font information identifying each font in a collection of available fonts, the font information comprising a set of attribute values describing the visual appearance of each font;
    identifying a set of navigation attributes defining a navigation space, each font in the collection of available fonts having a location in the navigation space defined by a plurality of the attribute values for the font;
    identifying the attribute values of a current font;
    receiving from the user one or more first input values designating a desired change in the appearance of the current font and corresponding to a change in one or more attribute values of the current font;
    using one or more attribute values of the current font and the first input values to define a first target location; and
    using the first target location to identify a first candidate font in the collection of available fonts by identifying a font with a location in the navigation space identical to the first target location if the collection of available fonts contains such a font, and, if the collection of available fonts does not contain such a font, identifying a font in the collection of available fonts that is close to the first target location in the navigation space.

11. The method of claim 10, further comprising:
    receiving from the user one or more second input values designating a desired change in the appearance of the current font or the first candidate font;
    using the second input values to define a second target location in the navigation space; and
    using the second target location to identify a second candidate font in the collection of available fonts by identifying a font with a location in the navigation space identical to the second target location if the collection of available fonts contains such a font, and, if the collection of available fonts does not contain such a font, identifying a font in the collection of available fonts that is close to the second target location in the navigation space.

12. A method for enabling a user to select a font from a collection of available fonts, comprising:
    receiving font data identifying each font in a collection of available fonts and identifying a location in a font space for each available font, the font space being defined by a set of font attributes, each location being defined by attribute values for all font attributes defining the font space;

identifying a set of navigation attributes defining a navigation space, the navigation attributes being derived from font attributes;

receiving from a user interactively a navigation input that specifies an input value for each of the navigation attributes, the input values defining a target location in the navigation space; and using the target location to identify a candidate font in the collection of available fonts by identifying a font with a location in the navigation space identical to the target location if the collection of available fonts contains such a font, and, if the collection of available fonts does not contain such a font, identifying a font in the collection of available fonts that is close to the target location in the navigation space.

13. The method of claim 12, wherein at least one navigation attribute is derived from a plurality of font attributes.

14. The method of claim 12, wherein the navigation space is a proper subspace of the font space.

15. The method of claim 12, wherein at least one input navigation attribute value defines a range of font attribute values.

16. The method of claim 12, wherein the target location defines a volume in the navigation space and the font with a location in the navigation space identical to the target location comprises a font with a location within the volume defined by the target location.

17. A computer program product, tangibly stored on a computer-readable medium, for enabling a user to select a font from a collection of available fonts, the program comprising instructions to:

receive font data identifying each font in a collection of available fonts and identifying a location in a navigation space for each available font, the navigation space being defined by a set of navigation attributes, each navigation attribute corresponding to a visual font characteristic, each location being defined by a set of navigation attribute values for all navigation attributes defining the navigation space;

receive from the user interactively a first navigation input that specifies a first input value for each of the navigation attributes in a subset of navigation attributes including less than all the navigation attributes, the first input values defining a first target location in the navigation space; and use the first target location to identify a first candidate font in the collection of available fonts by identifying a font with a location in the navigation space identical to the first target location if the collection of available fonts contains such a font, and, if the collection of available fonts does not contain such a font, identifying a font in the collection of available fonts that is close to the first target location in the navigation space.

18. The computer program product of claim 17, further comprising instructions to:

receive from the user interactively a second navigation input that specifies a second input value for one or more navigation attributes, the second input values and the first input values defining a second target location in the navigation space; and use the second target location to identify a second candidate font in the collection of available fonts.

19. The computer program product of claim 17, wherein the instructions to receive a first input value for each attribute in the subset of navigation attributes comprise instructions to:

determine the navigation space location of a current font;

receive a first input value designating a desired change in an attribute value of the current font; and use the attribute values defining the navigation space location of the current font and the first input value designating the desired change to define the first target location.

20. The computer program product of claim 19, wherein the first target location defines a volume in the navigation space and the font with a location in the navigation space identical to the first target location comprises a font with a location within the volume defined by the first target location.

21. The computer program product of claim 20, further comprising instructions to:

enable the user to select the first candidate font for use in an application running on a computer.

22. The computer program product of claim 21, wherein:

the collection of available fonts comprises a collection of installed fonts.

23. The computer program product of claim 21, wherein:

the collection of available fonts comprises a collection of fonts stored at a location on the World Wide Web.

24. The computer program product of claim 23, further comprising instructions to:

download the new font from the location on the World Wide Web; and install the new font in the computer.

25. The computer program product of claim 17, wherein:

the navigation attributes are selected from the group consisting of family type, serif style, weight, proportion, contrast, stroke variation, arm style, letter form, midline and X height.

26. A computer program product, tangibly stored on a computer-readable medium, for enabling a user to select a font from a collection of available fonts, the program comprising instructions to:

receive font information identifying each font in a collection of available fonts, the font information comprising a set of attribute values describing the visual appearance of each font;

identify a set of navigation attributes defining a navigation space, each font in the collection of available fonts having a location in the navigation space defined by a plurality of the attribute values for the font;

identify the attribute values of a current font;

receive from the user one or more first input values designating a desired change in the appearance of the current font and corresponding to a change in one or more attribute values of the current font;

use one or more attribute values of the current font and the first input values to define a first target location; and use the first target location to identify a first candidate font in the collection of available fonts by identifying a font with a location in the navigation space identical to the first target location if the collection of available fonts contains such a font, and, if the collection of available fonts does not contain such a font, identifying a font in the collection of available fonts that is close to the first target location in the navigation space.

27. The computer program product of claim 26, further comprising instructions to:

receive from the user one or more second input values designating a desired change in the appearance of the current font or the first candidate font;

use the second input values to define a second target location in the navigation space; and use the second target location to identify a second candidate font in the collection of available fonts by identifying a font with a location in the navigation space identical to the second target location if the collection of available fonts contains such a font, and, if the collection of available fonts does not contain such a font, identifying a font in the collection of available fonts that is close to the second target location in the navigation space.

28. A computer program product, tangibly stored on a computer-readable medium, for enabling a user to select a font from a collection of available fonts, the program comprising instructions to:

receive font data identifying each font in a collection of available fonts, the font data identifying a location in a font space for each available font, the font space being defined by a set of font attributes, each location being defined by attribute values for all font attributes defining the font space;

identify a set of navigation attributes defining a navigation space, the navigation attributes being derived from font attributes;

receive from a user interactively a navigation input that specifies an input value for each of the navigation attributes, the input values defining a target location in the navigation space; and use the target location to identify a candidate font in the collection of available fonts by identifying a font with a location in the navigation space identical to the target location if the collection of available fonts contains such a font, and, if the collection of available fonts does not contain such a font, identifying a font in the collection of available fonts that is close to the target location in the navigation space.

29. The computer program product of claim 28, wherein at least one navigation attribute is derived from a plurality of font attributes.

30. The computer program product of claim 28, wherein the navigation space is a proper subspace of the font space.

31. The computer program product of claim 28, wherein at least one input navigation attribute value defines a range of font attribute values.

32. A system for enabling a user to select a font from a collection of available fonts, comprising:

means for receiving font data identifying each font in a collection of available fonts and identifying a location in a navigation space for each available font, the navigation space being defined by a set of navigation attributes, each navigation attribute corresponding to a visual font characteristic, each location being defined by a set of navigation attribute values for all navigation attributes defining the navigation space;

means for receiving from the user interactively a first navigation input that specifies a first input value for each of the navigation attributes in a subset of navigation attributes including less than all the navigation attributes, the first input values defining a first target location in the navigation space; and means for using the first target location to identify a first candidate font in the collection of available fonts by identifying a font with a location in the navigation space identical to the first target location if the collection of available fonts contains such a font, and, if the collection of available fonts does not contain such a font, identifying a font in the collection of available fonts that is close to the first target location in the navigation space.

33. The system of claim 32, further comprising:

means for receiving from the user interactively a second navigation input that specifies a second input value for one or more navigation attributes, the second input values and the first input values defining a second target location in the navigation space; and means for using the second target location to identify a second candidate font in the collection of available fonts.

34. The system of claim 32, wherein the means for receiving a first input value for each attribute in the subset of navigation attributes comprises:

means for determining the navigation space location of a current font;

means for receiving a first input value designating a desired change in an attribute value of the current font; and means for using the attribute values defining the navigation space location of the current font and the first input value designating the desired change to define the first target location.

* * * * *

UNITED STATES PATENT AND TRADEMARK OFFICE
CERTIFICATE OF CORRECTION

PATENT NO. : 6,512,531 B1  
DATED : January 28, 2003  
INVENTOR(S) : Richard A. Gartland and Richard A. Gartland It is certified that error appears in the above-identified patent and that said Letters Patent is hereby corrected as shown below:

<u>Title page,</u>
Item [56], OTHER PUBLICATIONS, please correct the following:

"FontAssist 2.3 Review,"
wysiwyg://7.//http://www.vakcer.com/oberon/reviews/fontassist.htm, Jan. 31, 1999

"Paul Bonner, "On Windows Computer Shopper," vol. 14, p. 530 (Aug. 1994)."

Signed and Sealed this

Nineteenth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,512,531 B1
DATED : January 28, 2003
INVENTOR(S) : Richard A Gartland It is certified that error appears in the above-identified patent and that said Letters Patent is hereby corrected as shown below:

Title page,
Item [56], OTHER PUBLICATIONS, please correct the following:

"FontAssist 2.3 Review,"
wysiwyg://7/http://www.vakcer.com/oberon/reviews/fontassist.htm, January 31, 1999

"Paul Bonner, "On Windows Computer Shopper," vol. 14, p. 530 (Aug. 1994)."

This certificate supersedes Certificate of Correction issued August 19, 2003.

Signed and Sealed this

Twenty-second Day of March, 2005

JON W. DUDAS
*Director of the United States Patent and Trademark Office*